(12) United States Patent
Hazur et al.

(10) Patent No.: US 10,115,038 B2
(45) Date of Patent: Oct. 30, 2018

(54) METHOD FOR ADAPTIVE LEARNING UTILIZING FACIAL RECOGNITION

(71) Applicant: EdTech Learning LLC, Lahaina, HI (US)

(72) Inventors: Phillip Hazur, Lahaina, HI (US); Elizabeth Hazur, Lahaina, HI (US)

(73) Assignee: EdTech Learning LLC, Lahaina, HI (US)

( * ) Notice: Subject to any disclaimer, the term of this patent is extended or adjusted under 35 U.S.C. 154(b) by 0 days.

(21) Appl. No.: 15/649,384

(22) Filed: Jul. 13, 2017

(65) Prior Publication Data

US 2018/0018540 A1    Jan. 18, 2018

Related U.S. Application Data

(60) Provisional application No. 62/362,692, filed on Jul. 15, 2016.

(51) Int. Cl.
| | | |
|---|---|---|
| *G06K 9/62* | (2006.01) | |
| *G09B 5/06* | (2006.01) | |
| *G09B 5/02* | (2006.01) | |
| *G09B 7/04* | (2006.01) | |
| *G09B 7/08* | (2006.01) | |
| *G09B 7/077* | (2006.01) | |
| *G06K 9/00* | (2006.01) | |

(52) U.S. Cl.
CPC ....... *G06K 9/6263* (2013.01); *G06K 9/00302* (2013.01); *G06K 9/00335* (2013.01); *G09B 5/02* (2013.01); *G09B 5/065* (2013.01); *G09B 7/04* (2013.01); *G09B 7/077* (2013.01); *G09B 7/08* (2013.01)

(58) Field of Classification Search
CPC .................................................... G06K 9/6263
USPC ......................................................... 434/309
See application file for complete search history.

(56) References Cited

U.S. PATENT DOCUMENTS

| | | | | |
|---|---|---|---|---|
| 2015/0099255 A1* | 4/2015 | Aslan | ....... | G09B 5/08 434/350 |
| 2016/0203726 A1* | 7/2016 | Hibbs | ....... | G09B 7/02 434/308 |

OTHER PUBLICATIONS

D'Mello et al., Toward an Affect-Sensitive AutoTutor, IEEE Intelligent Systems ( vol. 22, Issue: 4, Jul.-Aug. 2007 ).*
"Detect Face and Emotion with Azure Media Analytics," available at <https://docs.microsoft.com/en-us/azure/media-services/media-services-face-and-emotion-detection> at least as early as Dec. 9, 2017.
Emotuit engagement analytics for learning management systems, available at <https://www.emotuit.com/engagement-analytics>, some portions available at least as early as Nov. 8, 2014.

* cited by examiner

*Primary Examiner* — Thomas Hong
(74) *Attorney, Agent, or Firm* — Durham Jones & Pinegar; Christopher Wight; Sarah W. Matthews (57) ABSTRACT

A computer implemented method for significantly increasing the efficacy of computer adaptive learning (which currently measures and acts on a learner's performance in the cognitive or objective learning domain of education) by additionally detecting and identifying the learner's emotional response data and together with the cognitive data, optimizing the educational content being presented. These emotional responses constitute the affective or emotional domain of education.

19 Claims, 9 Drawing Sheets

Figure 1: Author Preparing Instructional Components For Use in Computer Adaptive Learning System Figure 4: Capturing and Storing Cognitive Data in an Adaptive Learning System Figure 5: Capturing and Storing Affective Data in an Adaptive Learning System Figure 7: Storage and Sharing of Data to Support Long Term Analysis of the Efficacy of the Invention Figure 8: Examples of Feelings and Emotions (Affective Data) That Could be Identified and Captured Figure 9: Functional Hardware Diagram to Enable Adaptive Learning Utilizing Facial Emotion Recognition

METHOD FOR ADAPTIVE LEARNING UTILIZING FACIAL RECOGNITION

FIELD OF INVENTION

This invention is in the technical field of multi-modal computer adaptive learning. In particular, the present invention relates to methods of adaptive learning that that take into account a learner's affective or emotional response to instructional components.

BACKGROUND OF INVENTION

There are essentially two basic types of adaptive learning. The first is referred to as "facilitator-driven," and refers to products that provide instructors with actionable student and cohort profiles. The second type is called "assessment-driven," referring to a system that provides close-to-real-time (sometimes called "dynamic") adjustments of the instructional content. The assessment-driven approach is typically based solely on cognitive assessments, which have limited value in assessing learning conditions outside the realm of the assessment itself, which may be relevant to the learner's particular learning skill set and individual style of learning. Assessment-drive methodologies, however, have not yet been developed that can take into account non-cognitive components relevant to the learning process. Accordingly, there is a need to develop methodologies and systems capable of evaluating non-cognitive assets of a learner, such as affective or emotional states.

SUMMARY OF INVENTION

The present invention relates to computer implemented methods and systems for integrating affective or emotional based user data with traditional cognitive data in computer adaptive learning.

The invention utilizes a variety of measurements of learner performance and learning trends (especially learner affective or emotional data captured, for example, by a webcam) and together with the cognitive data collected, creates an optimized prescription of learning content that will increase student engagement, learning, and retention.

Furthermore, this invention describes the process flow and necessary computer hardware and software necessary to construct, deliver, and analyze the cognitive and affective data. Cognitive data refers to the student's ability to accurately respond to any activity that is performance-oriented in nature. Affective data is much more complex to capture, made possible only through recent advances in webcam fidelity as well as off-the-shelf software that can accurately take an image of the learner's face at speeds of up to every 1-3 seconds and analyze the facial expressions to identify those emotions most closely linked to effective learning. These emotions each have a valence value, or the degree of attraction or aversion expressed by the learner regarding how strongly they react towards a specific instructional component. Individual emotions normally occur within a range of a super-set of feelings. These are well-defined later in this document.

The invention relates specifically to learner's emotional reactions as they encounter learning content presented to them, with the content normally incorporated with this invention being presented via learning software running on computerized device being used by the learner. The invention will enhance current computer adaptive learning through the addition of the learner's emotional response to the learning software (whether the software is focused on presentation of content, practice exercises regarding the content, simulations allowing more in-depth practice, or evaluations of the learner's level of mastery of the content). A web camera will continually or intermittently pass facial images of the student to the emotional recognition software, which will then record the emotional response along with a time correlation to allow the cognitive/affective learning algorithm to determine precisely what the learner was doing in the lesson at the moment each emotion is captured.

In some aspects the emotional response data is correlated with the instructional components, so as to identify particular instructional components that give rise to a particular emotional response, an indicator of the learner's learning status and learning ability.

A computer implemented method is disclosed for integrating affective based user data with traditional cognitive data in computer adaptive learning comprising: presenting one or more instructional components (with full instructional component metadata for the adaptive learning system to reference) to a learner; capturing emotional response data in a learning profile for each learner in reaction to the one or more instructional components, wherein the emotional state data includes facial expression data while the one or more instructional components are presented; inferring emotional states, using one or more processors to analyze the facial expression data which was captured; capturing cognitive data for the learner based on the learner's correct or incorrect answer to the one or more instructional components, wherein the cognitive data is indicative of the learner's performance in responding to the one or more instructional components; assigning a positive or negative adaptivity score based on the individual's emotional state as well as the cognitive data, wherein the negative adaptivity score is based on a negative emotional state and/or a negative cognitive score based on incorrect answers to the one or more instructional components and indicates a need to provide an alternative learning pathway relating to the one or more instructional components, and the positive adaptivity score is based on a positive emotional state and/or a positive cognitive score based on correct answers to the one or more instructional components and indicates that the individual is prepared for advancement to a higher level of learning; populating the learner profile with the adaptivity score; and generating supplemental learner profile data by combining the cognitive data and emotional response data and comparing such data to normed learner population data to select an adaptive instruction to provide to the learner; populating the learner profile with the cognitive score to provide a learner profile containing more appropriate learning modalities for the learner; and providing alternative remedial instructional components to the learner relating to the one or more instructional components in the event of a negative adaptivity score, and presenting advanced instructional components to the learner in the event of a positive adaptivity score, wherein the step of providing alternative remedial instructional components and presenting an advanced instructional components further takes into account the supplemental learner profile data and the learning modalities for the learner.

The mental state data may be captured from multiple people and further comprising aggregating the mental state data from the multiple people. The method may further comprise modifying the instructional components based on the mental state data which was aggregated from the multiple people. The mental state data may include one of a group consisting of physiological data, facial data, and under some conditions, actigraphy data. The facial data may include information on one or more of a group consisting of facial expressions, action units, head gestures, smiles, brow furrows, squints, lowered eyebrows, raised eyebrows, smirks, and attention. The physiological data may include one or more of electrodermal activity, heart rate, heart rate variability, skin temperature, and respiration (only under conditions where these physiological reactions can be measured). The method will further comprise inferring of mental states based on the mental state data which was collected. The mental states may include one of a group consisting of frustration, confusion, disappointment, hesitation, cognitive overload, focusing, being engaged, attending, boredom, exploration, confidence, trust, delight, skepticism, and satisfaction. The playing of the first media presentation may be done on a mobile device and further comprising recording of facial emotion images with the mobile device as part of the capturing of the mental state data.

In some embodiments, a computer program product embodied in a non-transitory computer readable medium may comprise: code for presenting one or more instructional components (with full instructional component metadata for the adaptive learning system to reference) to a learner; code for capturing emotional response data in a learning profile for each learner in reaction to the one or more instructional components, wherein the emotional state data includes facial expression data while the one or more instructional components are presented; code for inferring emotional states, using one or more processors to analyze the facial expression data which was captured; code for capturing cognitive data for the learner based on the learner's correct or incorrect answer to the one or more instructional components, wherein the cognitive data is indicative of the learner's performance in responding to the one or more measurable instructional components; code for assigning a positive or negative adaptivity score based on the individual's emotional state as well as the cognitive data, wherein the negative adaptivity score is based on a negative emotional state and/or a negative cognitive score based on incorrect answers to the one or more instructional components and indicates a need to provide an alternative learning pathway relating to the one or more instructional components, and the positive adaptivity score is based on a positive emotional state and/or a positive cognitive score based on correct answers to the one or more instructional components and indicates that the individual is prepared for advancement to a higher level of learning; code for populating the learner profile with the adaptivity score; and code for generating supplemental learner profile data by combining the cognitive data and emotional response data and comparing such data to normed learner population data to select an adaptive instruction to provide to the learner; code for populating the learner profile with the cognitive score to provide a learner profile containing learning modalities for the learner; and code for providing alternative remedial instructional components to the learner relating to the one or more instructional components in the event of a negative adaptivity score, and presenting advanced instructional components to the learner in the event of a positive adaptivity score, wherein the step of providing alternative remedial instructional components and presenting advanced instructional components further takes into account the supplemental learner profile data and the learning modalities for the learner.

In some embodiments, a computer system is provided for cognitive and affective based computer adaptive learning comprising: a memory for storing instructions; a webcam for capturing facial data; one or more processors attached to the memory wherein the one or more processors are configured to: present one or more instructional components to a learner; capture affective state data of the learner in response to the one or more instructional components, wherein the emotional state data includes facial data while the one or more instructional components are presented; infer emotional states, using one or more processors to analyze the facial data which was captured; capture cognitive data for the learner based on the learner's correct or incorrect answer to the one or more instructional components, wherein the cognitive data is indicative of the learner's performance in responding to the one or more instructional components; assign a positive or negative adaptivity score based on the individual's emotional state as well as the cognitive data, wherein the negative adaptivity score is based on a negative affective state and/or a negative cognitive score based on incorrect answers to the one or more instructional components and indicates a need to provide an alternative learning pathway relating to the one or more instructional components, and the positive adaptivity score is based on a positive emotional state and/or a positive cognitive score based on correct answers to the one or more instructional components and indicates that the individual is prepared for advancement to a higher level of learning; populate a learner profile with the adaptivity score; and provide alternative learning content to the learner relating to the one or more instructional components in the event of a negative adaptivity score, and presenting a higher level of learning to the learner in the event of a positive adaptivity score.

In some embodiments, a computer implemented method for affect based learning is provided comprising: presenting one or more instructional component(s) to a learner; capturing emotional state data of the learner in response to the one or more instructional component; inferring emotional states, using one or more processors, based on the emotional state data which was captured and analysis of the facial data; capturing cognitive data for the learner based on the learner's response to the one or more instructional component; assigning a positive or negative adaptivity score based on the individual's emotional state and cognitive data; populating a learner profile with the adaptivity score; and providing alternative learning relating to the one or more instructional components in the event of a negative adaptivity score, and presenting a higher level of learning to the learner in the event of a positive adaptivity score.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION OF PREFERRED EMBODIMENTS

The present disclosure provides a description of various methods and systems for optimizing the flow of instructional components, or learning objects, in a manner that increases the level of learner engagement, comprehension of instructional content, and the ability for the learner to demonstrate the knowledge acquired through the use of cognitive evaluation tools including, but not limited to, measured exercises and/or simulations as well as relevant assessment questions. These methods and systems are part of a technology known as computer adaptive learning or CAL, which is defined as an educational method which uses computers as interactive teaching devices, and to orchestrate the allocation of human and mediated resources according to the unique needs of each learner.

Cognitive data refers to the results of psychological process involved in acquisition and understanding of knowledge, formation of beliefs and attitudes, and decision making and problem solving. Up to this point in time, computer adaptive learning practices and capabilities have focused almost exclusively on cognitive data to make up unique educational prescriptions of the instructional content to be presented to the learner.

However, long-standing pedagogical research and classroom practices have also been aware of and to a limited extent included the need to know how the student "feels" about the instruction they are receiving as well as the manner in which they are receiving the content. Recent technical advances in computerized facial recognition and resulting analysis of affective (emotional) reactions to content being presented have opened up a host of possibilities that have not yet been taken advantage of. In his seminal book "Taxonomy of Educational Objectives," Benjamin Bloom identified three basic domains of learning; cognitive, affective, and psychomotor. Of those three primary domains, while the cognitive domain once was the sole source for computer adaptive data, recent technology advances in identifying data in the emotional (affective) domain have opened the door to significant enhancements and improvements in the area of more robust and efficient computer adaptive learning.

Thus, adaptive learning systems have previously failed to also utilize cognitive analysis of objective student responses to interactive content performance. Moreover, such systems have not possessed the ability to supplement the learner's cognitive data with affective or emotional response data to determine changes in the learner's level of interest, their values, and their attitudes towards the content being presented. In the absence of the above, such systems cannot develop new educational "prescriptions" based on both measurement of learner performance as described above coupled with the development and analysis of a learner profile contain learning modalities such as auditory learners, visual learners, physical learners who learning by "doing," and social learners who learn by interacting with one (micro) or more (macro) other individuals such as through a chat capability integrated in the learning software.

The present disclosure provides a description of various methods and systems for analyzing a learner's affective or emotional state as they are presented with an instructional component. The ability to properly evaluate a learner's response to an instructional components can enable accurate recommendations for subsequent instructional components presented to the learner. The instructional components may be presented for any purpose including, but not limited to, education, general information, entertainment, comprehension, advertising campaign evaluations, political campaign purposes, and so forth. Thus, the term "instructional component" as used herein, is intended to encompass not only instructional content designed to present new information, but evaluations or "testing" of previously presented instructional content, as well as opinions, positions, values and other intellectual content within the mind of a subject or learner. Evaluation of a learner's emotional or affective state, in conjunction with their cognitive state of learning, provides unequaled insight into the learner's true state of comprehension, learning progress, opinions and knowledge. Examples of emotional or affective mental states may include confusion, comprehension, understanding, frustration, happiness, sadness, etc. Observing, capturing, and analyzing these mental states can yield significant information about a learner's reaction to an instructional component presented to them and whether the instructional component is being presented in the right sequence or progression for the learner's optimal learning progression. The mental states can be inferred from the user's affect presented by facial information, such as smiles, frowns, brow furrows, squinting and other visible affect based on the learner's emotional state. Thus the learner's emotional state can be inferred from their affective response to questions or other instructional components. Recommendations for subsequent instructional components, either more remedial instructional components, or more advanced instructional components, may be made based on tracking when someone reacts positively to an instructional components, such as with a smile and recommending progressively more challenging instructional components, and may further be based on similarities with other learner's who made a similar emotional response when confronted with the same instructional component.

Various steps in the flow diagrams shown in the drawings may be changed in order, repeated, omitted, or the like without departing from the disclosed inventive concepts. Various embodiments of the flow diagrams may be included in a computer program product embodied in a non-transitory computer readable medium that includes code executable by one or more processors. The flow diagrams may include tagging the plurality of media presentations with mental state information based on the mental state data which was captured.

Moreover, the cognitive observations, affective observations, and development of an optimized learning path of instructional components cannot reasonably be performed by an individual or even a group of pedagogical and subject matter experts because the number of necessary human observers could not reasonably scale to the number of students. Moreover, the amount of time between human observation and the resulting adaptive learning pathway of optimized instructional components would be too far separated in time to prove helpful to the learner. A virtually instantaneous adaptive learning response is necessary for optimal learning outcomes. Thus, there are likely significant advantages to presentation of new learning material immediately upon evaluation of an emotional state, which is not possible with a human teacher who is unable to access such new learning material without a significant delay in the teaching setting. Manually-derived adaptive prescriptions are also imprecise, subjective, and often unreliable. A learner's emotional response data can therefore be more accurately and more timely evaluated by computer, which response can be based on aggregated emotional response data from other learners that has been validated by improved performance based on adaptive sequence of learning materials from a larger population of learners.

By adding affective domain data with cognitive domain data, a designer or developer of computer adaptive learning will be able to develop resequenced and more effective interactive instructional components that much more accurately allocates content and resources based on a more robust and complete set of unique learner needs and characteristics. Furthermore, the methods disclosed herein for increasing the efficacy of computer adaptive learning will also result over time in the merging of an extremely robust set of adaptive prescriptions, learning styles and their interdependencies with specific learner characteristics and abilities, that will allow machine learning (the ability for a computer to learn and sequence content on its own without external input from an instructional designer, programmer, etc.) by utilizing artificial intelligence processing to make recommended enhancements to optimize most all aspects of the adaptive learning system and the resulting customized lesson flow that best matches learner characteristics and capabilities with specific instructional components.

The methods and systems of the present invention are described and illustrated in the Figures, which show flow diagrams illustrating the computer implemented processes of the present invention. It is understood that the figures illustrate only one particular methodology for implementing the present invention, and that the steps in the process may be modified in sequence or content to arrive at the same or similar results. Thus those of ordinary skill in the art will contemplate alternative sequences of the processes that are contemplated to be within the scope of the present invention.

Figure 1:
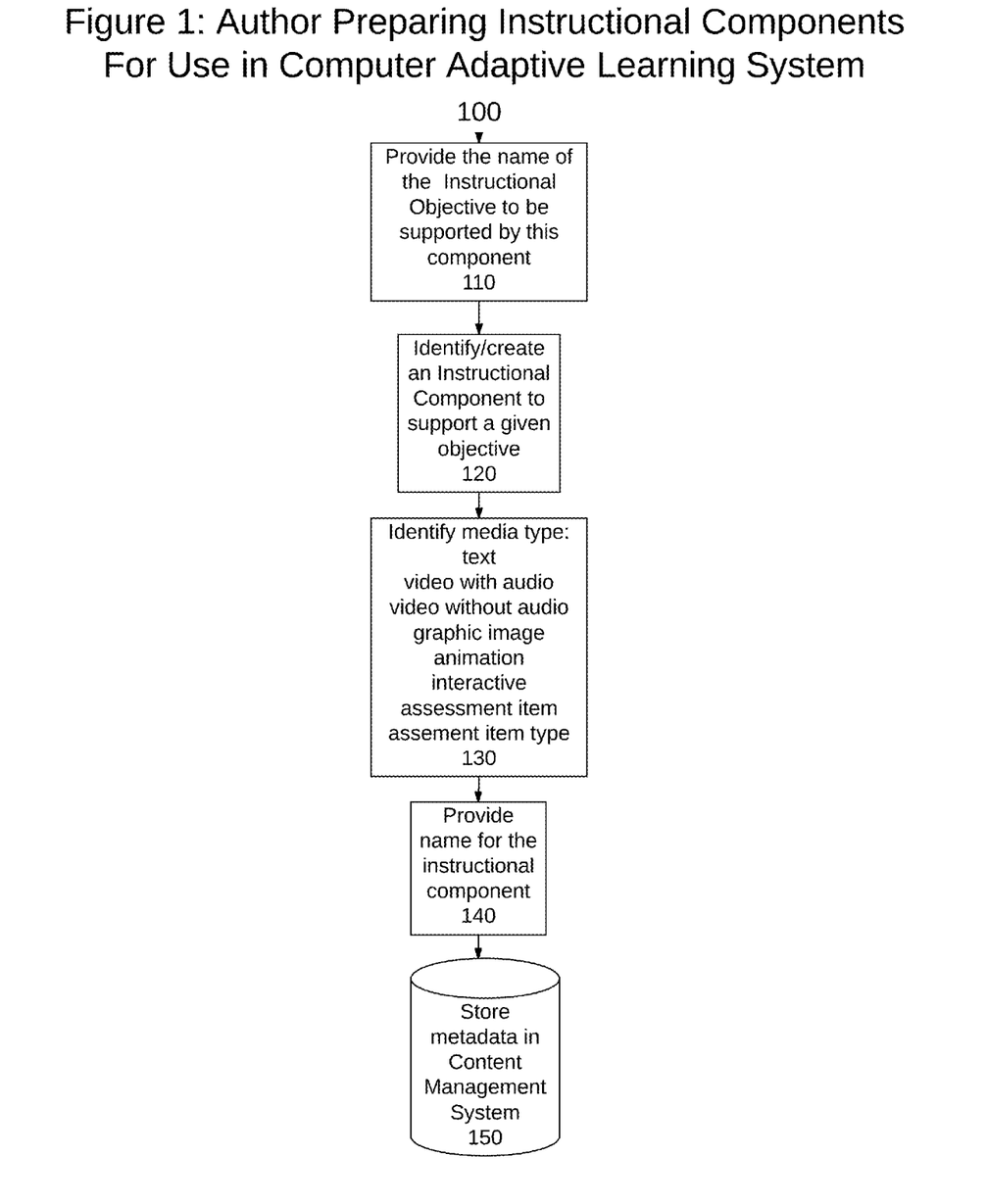
FIG. 1 is a diagram that shows some of the primary functions that a lesson author will need to perform to prepare data for incorporation of Computer Adaptive Learning.

FIG. 1 is a flow diagram for preparing instructional components for use in a Computer Adaptive Learning System. Instructional components can exist in many formats, including lines of text, diagrams, videos with or without narration, computer-based interactives such as dragging an object and dropping it in the appropriate target on the screens, sorting activities, manipulatives, such as changing the density and weight of a cannonball and angling the cannon so that when discharged the newly specified cannonball lands in the target area, etc.

The flow 100 may continue with embedding the instructional component within a web-enabled interface wherein the web-enabled interface activates collecting of mental state data. The web-enabled interface may include a web page, web application, or the like. The embedding may include inserting a link for the video into a URL on a web page that activates affect collection. The embedding may include providing a link where a user can insert their own instructional component at a desired level of instruction. The affect may be collected by evaluating facial expressions. The evaluating facial expressions may include evaluating smiles or brow furrows. The affect may include evaluation of one of a group consisting of attention, engagement, interest, liking, and disliking. The affect may be collected by evaluating physiology.

FIG. 1 describes data preparation only and does not display data to the learner, and 130 shows examples of the type of media that could be used. The flow 100 further comprises storage of the instructional component in the content management system 150, perhaps in the web-enabled interface, and collecting the mental state data 150 while the instructional component is being played or after the learner has responded to the question or task presented. The mental state data may be collected for a group of people who view the instructional component.

The mental state data collected may include one of a group consisting of physiological data, facial data, and actigraphy data. The physiological data may include one or more of electrodermal activity, heart rate, heart rate variability, skin temperature, and respiration. The facial data may include information on one or more of a group consisting of facial expressions, action units, head gestures, smiles, brow furrows, squints, lowered eyebrows, attention, and the like. The actigraphy data may capture physical actions associated with rest or activity cycles, including hand, arm, or leg motions. The mental states that may be inferred may include one of a group consisting of frustration, confusion, disappointment, hesitation, cognitive overload, focusing, being engaged, attending, boredom, exploration, confidence, trust, delight, frustration, skepticism, and so on. The mental state data may be collected for an individual. Likewise, the mental state data may be captured from a sample of a plurality of other people and such data may be used as a baseline comparison to normalize the learner's affect or facial data within a particular category.

The flow may continue with analyzing mental state data. The mental state data may be analyzed to produce mental state information. Mental states for a viewer or a plurality of learners may be inferred based on the mental state data which was collected.

Each of these instructional components or learning objects may also be tagged with content metadata, such as target grade level, target difficulty level, a significantly valid average affective rating, etc. (IEEE SA—1484.12.1-2002 is a standard for learning object metadata that should be followed as strictly as possible). These instructional components are then arranged in a sequence by a lesson author to allow the learner to proceed, for example, through a lesson sequence that consists of the presentation of learning components in a pedagogically appropriate manner, culminating in a "lesson" that ideally results in the learner performing well on the final lesson assessment. Throughout the presentation of the learning objects, the learner is evaluated by the emotional recognition software so that the system can integrate the cognitive data along with affective data to create appropriate adaptive prescriptions.

FIG. 1 specifically shows the primary key emotional/affective elements for a computer implemented method for identifying the associated emotions during anytime of the presentation of the instructional components, and how to effectively enter and use the metadata associated with learning objects. The flow 100 begins with 110, providing the name of the instructional objective to be supported by the components. The flow continues with 120, identifying or creating an instructional component to support a given objection. In 130, the method identifies media type, such as text, video with audio, video without audio, graphic image, animation, interactive assessment item, assessment item type. The name for the instruction component is provided in 140. In 150, the metadata is stored with the learning object in the content management system.

Figure 2:
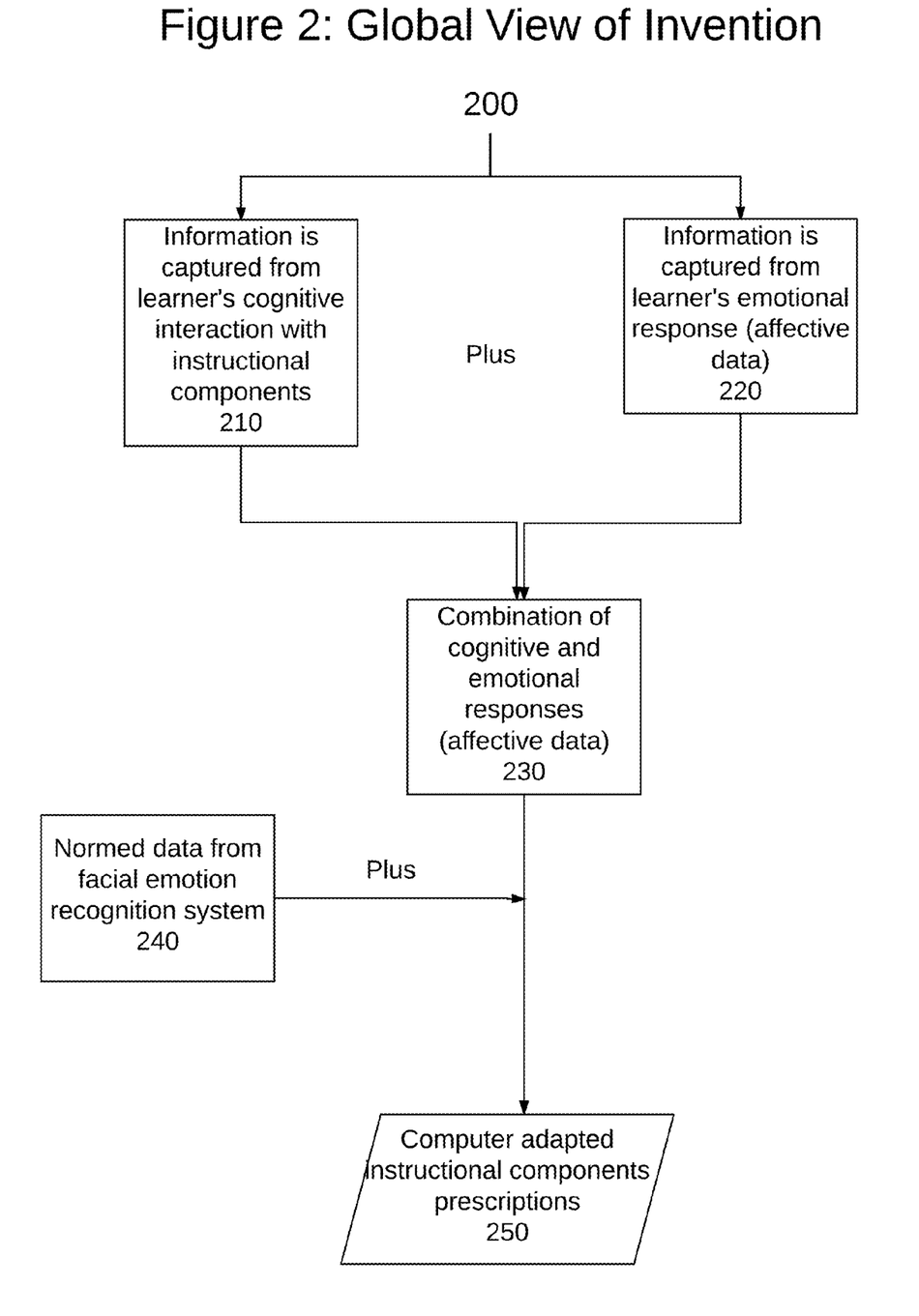
FIG. 2 is a global high-level flow diagram for preparing instructional components for a Computer Adaptive Learning System.

FIG. 2 is a global view of the embodiments of the invention described in the drawings that indicates how both cognitive and affective (emotional) data are combined, the affective data provided is analyzed against a database of a plurality of other people's faces, and then a new flow of instructional components are prescribed that will customize the learning path (if the cognitive and affective data analysis indicate that this is appropriate). In 210, information is captured from a learner's cognitive interaction with instructional components. Concomitantly, in 220, information is captured from the learner's emotional response (affective data). This information is aggregated in 230 as a combination of cognitive and emotional responses (affective data). In some embodiments, normed data from facial emotion recognition system 240 may further be contributed to the data to evaluate appropriate responses based on affective responses of other individuals. Mental state data may be collected from multiple people who view an instructional component, and the mental state data from the multiple people may be aggregated. Thus, the mental state data is aggregated across a group of people. Results from the aggregating 250 may be presented as part of the displaying of a graphical representation. The result is a set of computer adapted instructional components prescriptions 250.

The flow shown in 200 may continue with aggregating mental state data 230. Mental state data may be collected from multiple people who view an instructional component, and the mental state data from the multiple people may be aggregated. Thus, the mental state data is aggregated across a group of people. Results from the aggregating 230 may be presented as part of the displaying of a graphical representation.

Figure 3:
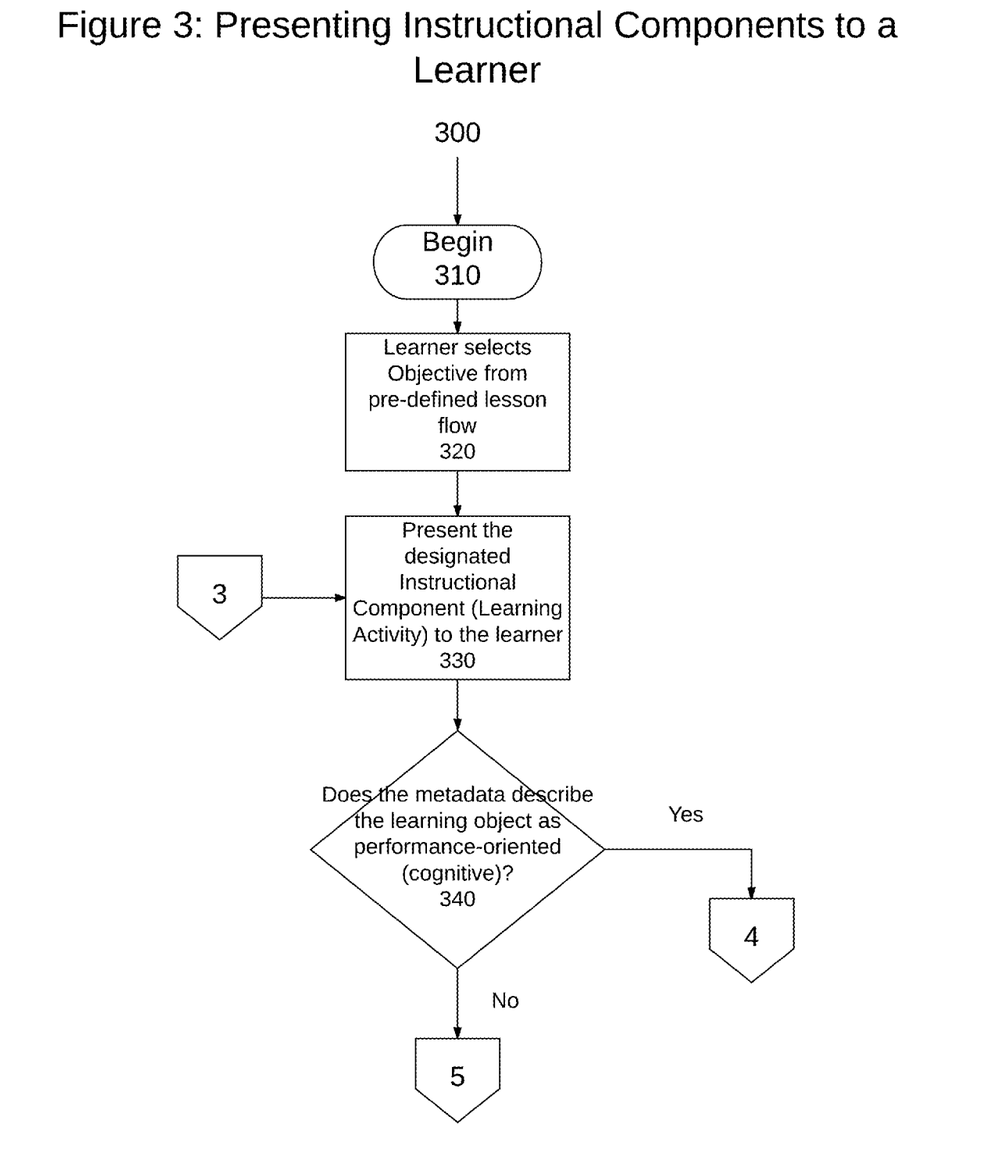
FIG. 3 is a flow diagram for presenting instructional components to a learner.
Figure 4:
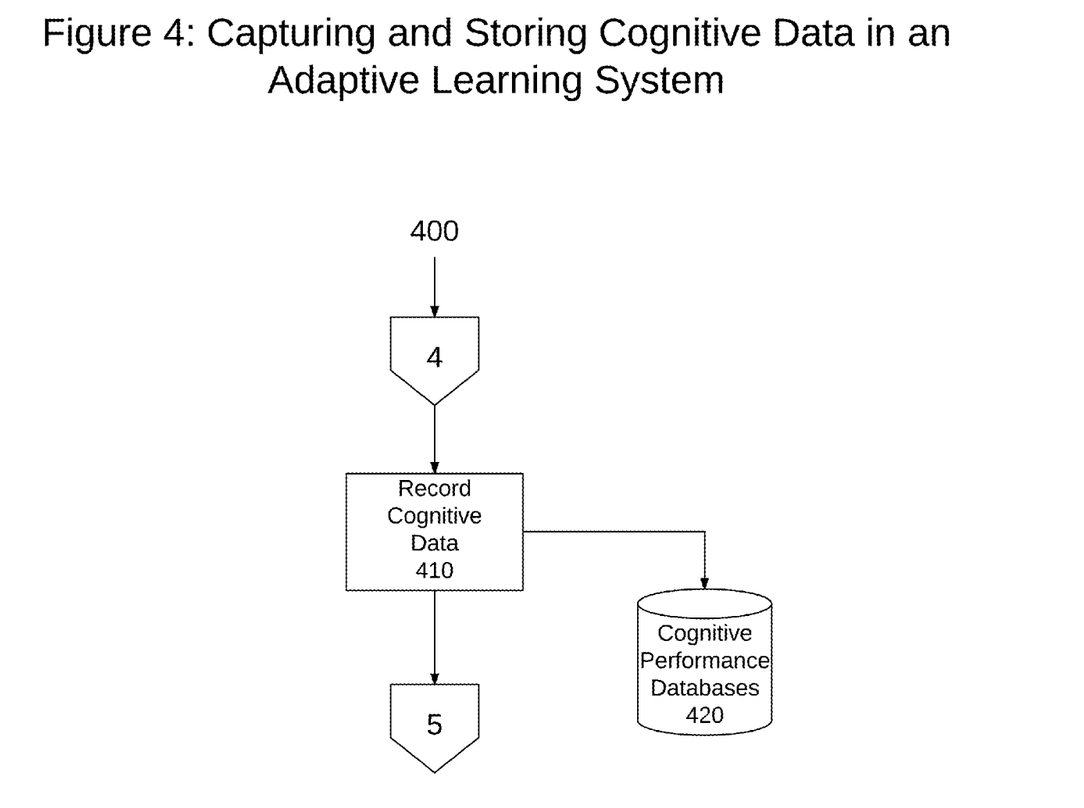
FIG. 4 is a flow diagram showing a system for capturing and storing cognitive data based on a learner's performance in a practice activity, review activity, a simulation activity, a lesson, chapter, or unit quiz, or any other objective assessment of learning.
Figure 5:
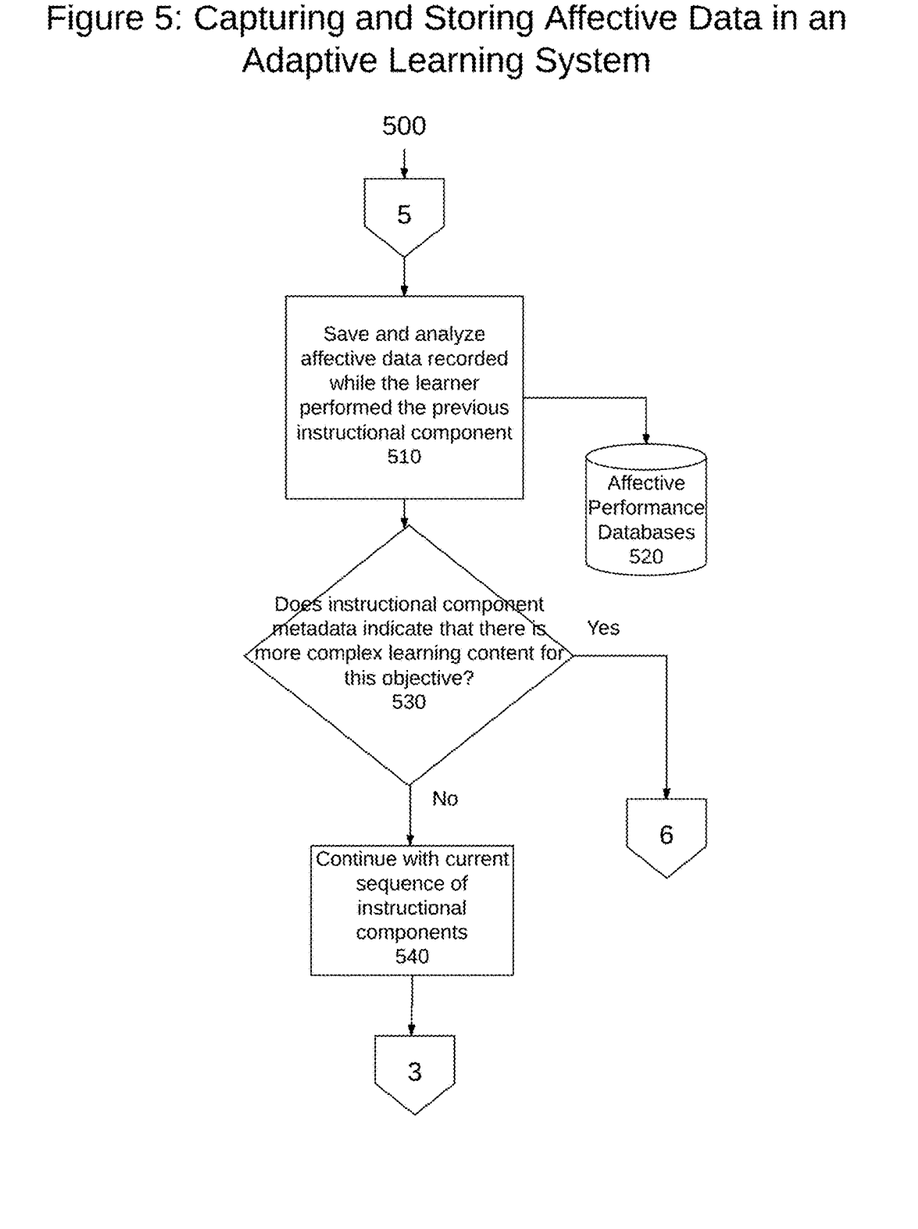
FIG. 5 is a flow diagram showing a system for determining a learner's affective, or emotional state throughout the instructional component and storing that emotional state.
Figure 6:
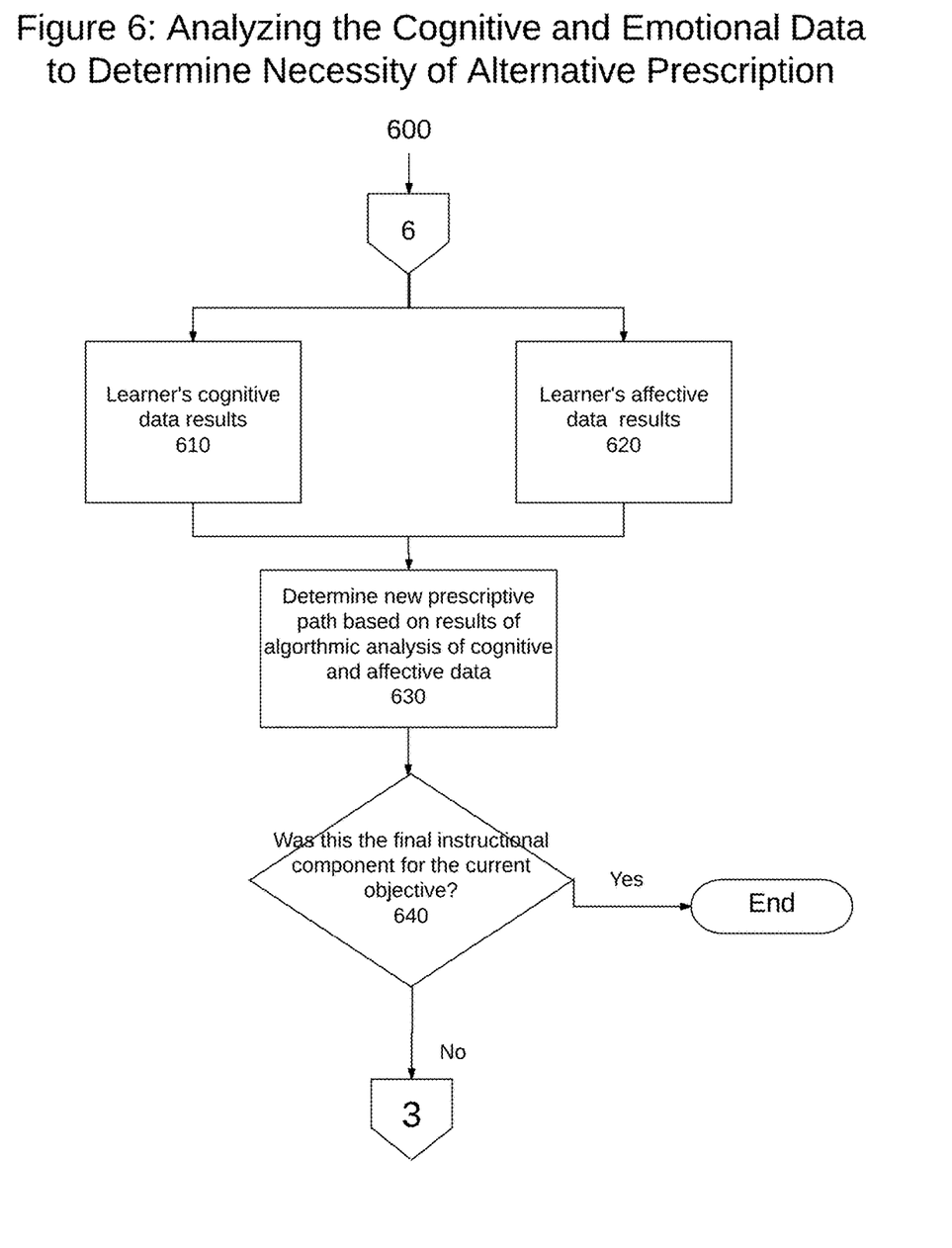
FIG. 6 is a flow diagram showing a system for analyzing the cognitive and emotional data to determine if a revision to the sequence, nature, and difficulty of the flow of instructional components should be modified to improve learning.

FIGS. 4-6 illustrate the sequence flow of the methods of the invention in greater detail, from beginning to end. The flow 300, shown in FIG. 3, may further comprise recommending an instructional component. The aggregating of the mental state data 230 and 250 may be used as part of the input to result in recommending an instructional component 320 and 330 to an individual based on the mental state data which was aggregated. The instructional component may be one of a group consisting of a question, a multiple choice question, a story problem, a review, in the form of a television show, a web series, a webisode, a video, a video clip, an electronic game, an advertisement used in an instructional manner, an e-book, or an e-magazine. The flow 300 may further comprise recommending an instructional component to a second person based on the mental state data collected from a first person. Various steps in the flow 300 may be changed in order, repeated, omitted, or the like without departing from the disclosed inventive concepts. Various embodiments of the flow 300 may be included in a computer program product embodied in a non-transitory computer readable medium that includes code executable by one or more processors. The flow 300 may include tagging the plurality of instructional components with mental state information based on the mental state data which was captured.

Software suitable for capturing mental state data and evaluating such data to assign or determine an emotional state is available from such companies as Affectiva, which has developed software packages referred to in the industry as Affdex SDK, Affectiva's emotional artificial intelligence humanizes how people and technology interact. The concept of humanizing the sequencing, skill leveling (making sure that the learner is at the right skill level), and presenting instructional learning content in a way that the learner finds more enjoyable provides a new and exciting opportunity to sequence the learning to elevate the computer-delivered learning content to a new level engagement and efficacy not previously found in computer-delivered learning content. Another product that identifies user emotions via facial images is nViso 3-D Facial Imaging (from the company nViso).

FIG. 3 further indicates the flow of presenting instructional components to the learner. At the teacher or learning administrator's discretion the learner may be required to navigate sequentially through the objectives of the learner and the learner may be able to attempt the objectives in any order they wish. The learner should be allowed to repeat an objective as many times as they wish, as this is consistent with current pedagogical practices and theory, although different learning districts or learning institutions may have rules prohibiting the ability for a learner to repeat content in some instructional or testing environments.

Although the following hierarchy of groupings of learning content is not necessary to utilize the invention, as it acts as a discrete collection of content and activities, it is included here to indicate that the invention does not interfere with a normal example of a teaching hierarchy. This example is: Objective, Lesson, Chapter, Unit, and Course. Flow 300 begins at 310 with the learner selecting the objective from a pre-defined lesson flow 320. The designated instructional component or learning activity is presented to the learner in 330. If the metadata for the current objective indicates that the current instructional component is performance-oriented (cognitive domain) then the learner is sent to the lesson flow designated on FIG. 4. If not, they are sent to the lesson flow designated on page 5. The activity on FIG. 4 simply records the results from the cognitive activity for later reference.

Figure 9:
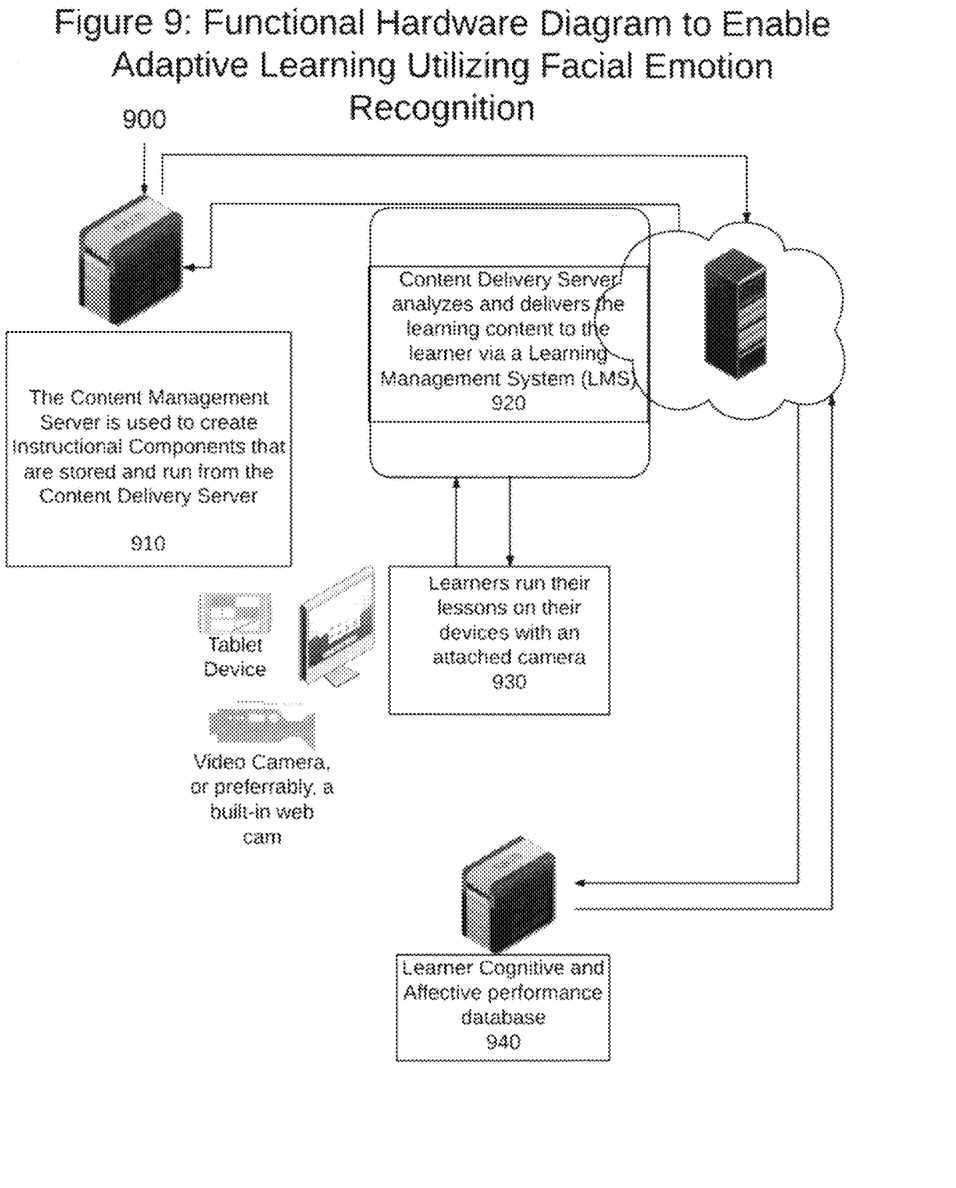
FIG. 9 is a flow diagram showing one possible hardware configuration to enable adaptive learning utilizing facial emotion recognition.

The flow 300, 400, 500, and 600 are run on a hardware and software system as shown in FIG. 9 and continue with distributing web-enabled interface 330 content to the user. The distributing or presenting of web-enabled interface may include sending a URL. The selection of the objective 320 and the sending of the URL is normally accomplished via a Learning Management System (LMS), which is used to plan and execute learning activities. An LMS is an off the shelf product, such as Moodle (distributed as free open source software through the GNU General Public License), Bridge (a product of the company Instructure), Blackboard Learn (a product of the company Blackboard), etc. In some embodiments, the sending may be accomplished by pressing or selecting a button on a web page associated with an instructional component. Selecting the button may distribute the instructional component. In some embodiments, selecting the button may also distribute mental state data or analysis of mental state data along with the instructional component.

FIG. 4 is a flow showing the process of capturing and recording the result of the cognitive activity in an adaptive learning system. The cognitive activity may be graded with a numerical score indicating learner performance or may be a pass/fail activity. Flow 410 records the cognitive data and the cognitive performance is recorded in the database at 420.

FIG. 5 shows a flow 500 showing the process wherein the facial emotional recognition software values from the learner's facial expressions are saved and analyzed, and stored in the affective performance database. Accurate analysis of the emotion being expressed, even subtly, may be evaluated on a human level by a human observer, but this is overcome by artificial intelligence in the facial emotional recognition software by focusing on the reaction of some 40+ facial muscles. When someone tries to express a disingenuous emotion, all of the 40+ muscles are not triggered. FIG. 5 shows flow 500 in which affective data that is recorded while the learner performs the previous instructional component is saved and analyzed 510 in an affective performance database 520. As shown in 530, if the instructional component metadata indicates that there is more complex learning content for this objective then the instructional components advance to 6 (flow 600). If not, the system continues with the current sequence of instructional components in 540 going back to flow 300.

Figure 8:
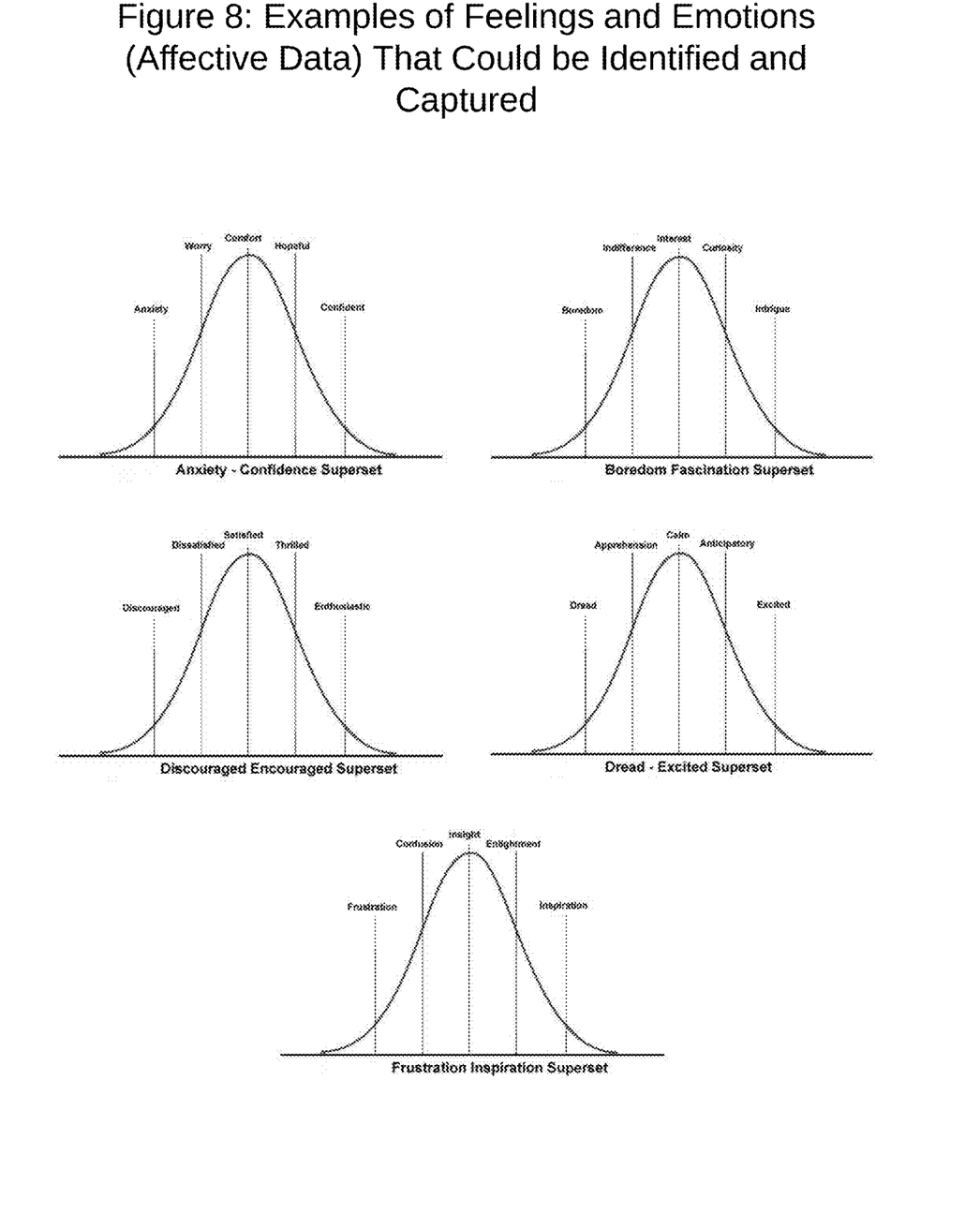
FIG. 8 is a series of statistical bell-curve diagrams that list the 5 super-sets of feelings, and where specific emotions lie in that statistical continuum of feelings.

The emotions that may be tracked and their range of emotions as shown in FIG. 8, may, for example, include:
Fear (on the anxiety-confidence scale)
Disgust (on the boredom-fascination scale)
Happiness (on the discouraged-encouraged scale)
Anger (on the frustration-inspiration scale)
Surprise (on the dread-excited scale)
Disgust (also on the frustration-encouraged scale)
Sadness (also on the discouraged-encouraged scale)

The above seven emotions were first identified by Paul Ekman and Wallace Friesen in the development of their Facial Action Coding System (FACS). There are two basic challenges in creating a computerized implementation of emotional responses. The first issue has been solved by many companies that offer products that perform this emotion analysis in real-time. The second obstacle, which is a significant part of this invention, is the creation and execution of the algorithms for adaptive learning, also running in real-time.

FIG. 5 is a diagram of an instructional component recommendation system. A person may view an instructional component. While the person is viewing an instructional component, an affect collector 510 may gather affect data on the person. The affect collector 510 may be a webcam or other camera device. The affect collector 510 may be a biosensor attached to the person in one or more locations. The affect data collected from the person by the affect collector 510 can be stored in an affect repository 520. The affect repository 520 may be on a local computer or on a remote server, or may be distributed or part of a cloud computing system. The affect information is stored in an affect repository such as an affective performance database 520.

Other people may view the same instructional component as the person. In some embodiments, multiple instructional components are viewed by the person and the other people. In embodiments, different subsets of the multiple instructional components are viewed by each person. The affect collector 510 may capture affect data for each of the learners. The affect collector 510 may be a single unit such as a tablet computer which collects affect for multiple learners viewing an instructional component in a common classroom setting. Alternatively the affect collector 510 may be separate devices such as in the case where each person has their own computer, laptop, cell phone, mobile device, or the like. The affect repository 520 may retain affect data from the people on whom affect data is collected.

An affect aggregator 510 may take affect data from the affect repository 520 and correlate affect data from the person with the other people. The affect aggregator 510 may recognize trends for the person who has been presented with multiple instructional components. The affect aggregator 510 may determine correlation vectors for the person and the people or a subset thereof. A correlation may be made using weighted Euclidean or Mahalanobis distance evaluation between two vectors, where a vector includes an individual's affect data. There are many ways to compute distances or similarity/dissimilarity measures. Collaborative filtering or the like may be used to aid in matching affect data between or among people. In some embodiments, a comparison is made based on the same content viewed by the person and by individuals from the other people. When one vector is at a sufficiently small distance from another person's vector then the affect aggregator will look for other content that has received similar responses. This other content may be recommended by the recommendation engine to the person because there are assumed similarities based on the affect data which was collected.

In some embodiments, the affect aggregator 510 and affect analyzer 630 may be used to review affect data stored in the affect repository to compare affect data collected on a new instructional component with an historical database of affect data for that instructional component. The new instructional component may be evaluated to determine how this instructional component ranks against other instructional component.

FIG. 6 shows flow 600, which illustrates that cognitive data results need to be a factor to be considered along with the affective data results so that both types of data (if cognitive data exists for that instructional component) can be provided into the adaptive learning computer. On this adaptive learning computer, a set of algorithms (a set of rules to be followed) will determine, through calculations of items such as measurements of central tendency for the affective data and determinations of delivering content that matches the learner's learning style, a new adaptive learning prescription or pathway of new learning activities.

In FIG. 6, flow 600 shows that the learner's cognitive data results 610 and the learner's affective data results 620 are combined to determine a new prescriptive path based on the results of the algorithmic analysis of the cognitive and affective data 630. If this represents the final instructional component for the current objection in 640, then that is the end of that particular instructional component sequence. If not, then the instructional component sequence continues with flow 300.

As shown in FIG. 6, an affect analyzer 630 may analyze the affect data collected from the person. The affect analyzer 630 may recognize mental states including information on concentration, liking, disliking, etc. The affect analyzer 630 may recognize smiles or frowns. Based on the analysis done by the affect analyzer 630 a recommendation engine 640 may recommend a new instructional components or remedial instructional component to the learner. The recommending of an instructional component to an individual may be based on the mental state data which was aggregated. The aggregated data may be for multiple instructional components by an individual or may be for a plurality of individuals. The recommendation may be based on common factors with one or more instructional components which the person was presented with. For example, if the person smiled for each of the instructional components that he or she watched with a specific set of learning objectives, then the recommendation engine 630 may recommend another instructional component with the slightly more advanced learning objectives.

Figure 7:
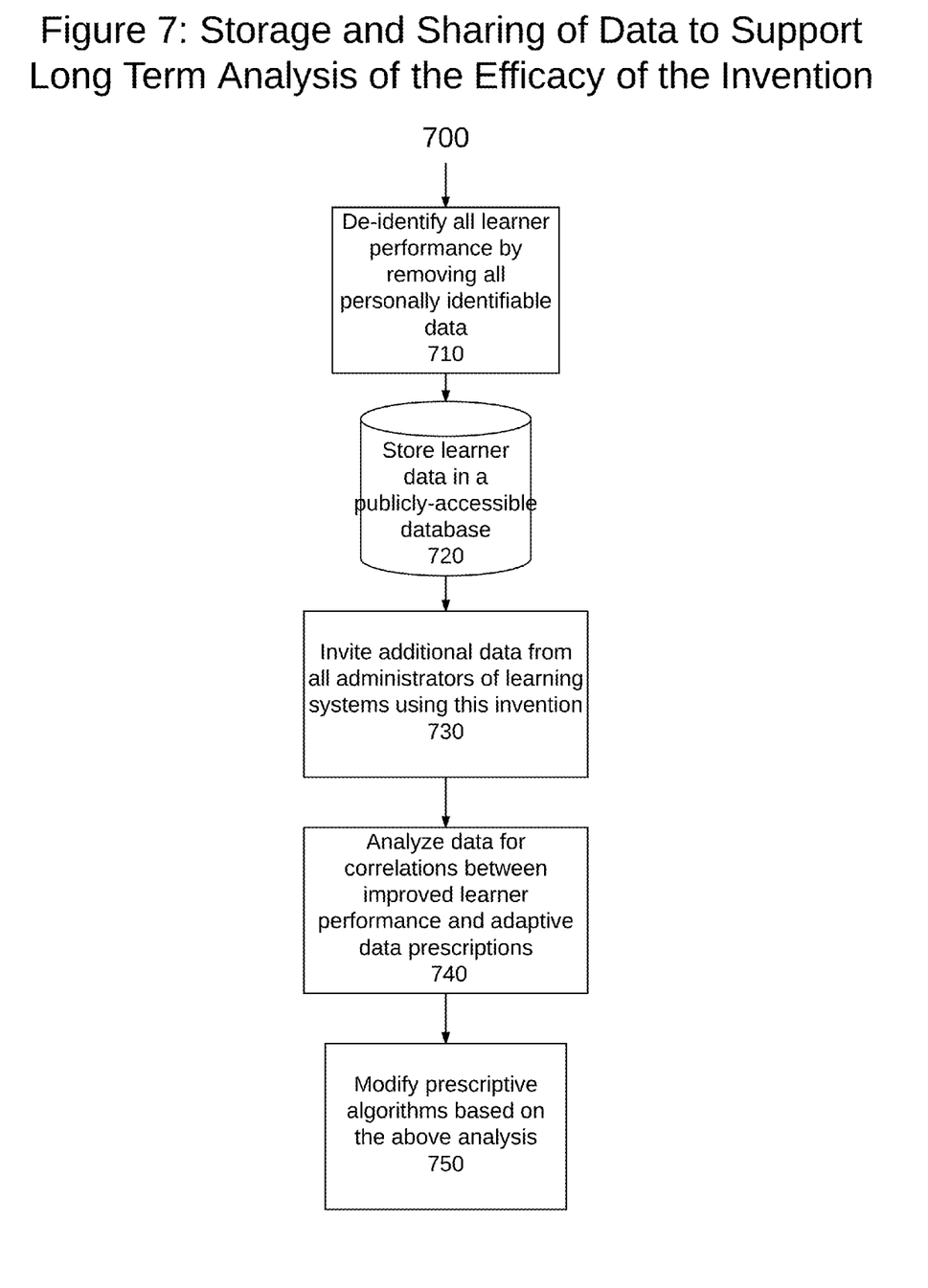
FIG. 7 is a flow diagram showing system for long-term analysis of the efficacy of the Computer Adaptive Learning System that includes the learner's emotional state as a criteria for making real-time enhancements to the sequence, nature, and difficulty of the revised (adaptive) flow of the instructional components.

Flow 700 is shown in FIG. 7, which shows the process of publicly archiving the pre- and post-performance of a learner that utilized the facial emotion recognition as a factor in adaptive learning. All users of this system will be strongly encouraged to first de-identify (remove all personally identifiable information) their data and then submit it for further analysis and comparison of results against other facial emotion adaptive learning content. As shown in flow 710, all learner performance is de-identified by removing all personally identifiable data. 720 shows that the de-identified learner data is stored in a publicly-accessible database. In 730 additional data is invited from all administrators of learning systems using the methods described herein. In 740 data is analyzed for correlations between improved learner performance and adaptive data prescriptions. In 750 the prescriptive algorithms based on the above analysis are modified, as appropriate in view of the data. Artificial Intelligence and machine learning code will be developed to perform this analysis and report on modifications that should be made to the adaptive algorithms referred to in FIG. 7.

FIG. 8 shows the primary key emotional/affective elements for identifying the associated emotions during anytime of the presentation of the instructional components, and how to effectively enter and use the metadata associated with learning objects. It is possible, but not necessarily obligatory, to utilize every feeling on these diagrams. This invention makes a recommendation of the most likely emotions or affective states to be identified and utilize but does not preclude the use of all emotions shown in the diagram. Each discrete collection of instructional components (synonymous with learning activities) will cover a single instructional objective. Recent reports indicate mobile device users are on their device for short periods of time (although the total can be hours per day). Therefore, instruction should be designed to meet the usage patterns of the learners; hence a single instructional objective will constitute the lowest level of learning objectives that have a complete sequence of learn, practice, and demonstrate proficiency learning activities.

FIG. 9 further shows a hardware and software system for capturing facial response to an instructional component. A system 900 includes an electronic display and a webcam 930. The system 900 captures facial response to an instructional component shown on the electronic display 930. The facial data may include video and a collection of information relating to mental states. The facial data may include information on one or more of a group consisting of facial expressions, action units, head gestures, smile, brow furrows, squints, lowered eyebrows, raised eyebrows, smirks, and attention. In some embodiments, a webcam 930 may capture video of the person 910. Images of the person 910 may also be captured by a camera on a computer (such as a laptop, a net-book, a tablet, or the like), a video camera, a still camera, a cell phone camera, a mobile device camera (including, but not limited to, a forward facing camera), a thermal imager, a CCD device, a three-dimensional camera, a depth camera, and multiple webcams used to capture different views of viewers or any other type of image capture apparatus that may allow image data captured to be used by an electronic system. The capture of the facial response of person 930 to instructional components 920 may include collection of mental state data. The capture of the facial response of person 930 to the instructional component 920 may also include capture of physiological data. The physiological data may include one or more of heart rate, heart rate variability, skin temperature, respiration, and the like.

The electronic display 930 may show an instructional component. The instructional component 930 may be shown on any electronic display, including but not limited to, a computer display, a laptop screen, a net-book screen, a tablet computer screen, a cell phone display, a mobile device display, a remote with a display, a television, a projector, or the like. The electronic display 930 may include connections to a keyboard, mouse, joystick, touchpad, wand, motion sensor, and other input means. The video 920 may be displayed within a webpage, a website, a web-enabled application, or the like. The images of the person may be captured by a video capture unit 930. In some embodiments, video of the person is captured while in others a series of still images are captured.

Analysis of action units, gestures, mental states, and physiological data may be accomplished using the captured images of the person 930. The action units may be used to identify smiles, frowns, and other facial indicators of mental states. The gestures, including head gestures, may indicate interest or curiosity. For example, a head gesture of moving toward the video 930 may indicate increased interest or a desire for clarification. Based on the captured images, analysis of physiology may be performed. Analysis of affect 940 may be performed based on the information and images which are captured. The analysis can include facial analysis and analysis of head gestures. The analysis can include evaluating physiology and may include evaluating one of a group consisting of heart rate, heart rate variability, respiration, perspiration, temperature, and other bodily evaluation.

The above methods may be executed on one or more processors on one or more computer systems. Embodiments may include various forms of distributed computing, client/server computing, and cloud based computing. Further, it will be understood that for the flow diagrams in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flow diagram illustrations depict methods, apparatus, systems, and computer program products. Each element of the block diagrams and flow diagram illustrations, as well as each respective combination of elements in the block diagrams and flow diagram illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which may be generally referred to herein as a "circuit," "module," or "system."

A programmable apparatus which executes any of the above mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer implemented method for integrating affective based user data with traditional cognitive data in computer adaptive learning comprising:

presenting to a learner one or more instructional components linked to full instructional component metadata for the adaptive learning system to reference;

capturing, by a camera in communication with one or more processors, affective data in a learning profile for the learner in reaction to the one or more instructional components, wherein the affective data includes facial expression data captured while the one or more instructional components are presented, and wherein the affective data is captured at least once every three seconds;

inferring emotional states of the learner, using the one or more processors to analyze the facial expression data which was captured;

capturing cognitive data for the learner based on the learner's correct or incorrect answer to the one or more instructional components, wherein the cognitive data is indicative of the learner's performance in responding to the one or more instructional components;

combining the cognitive data and the affective data and performing algorithmic analysis to determine the adaptive instruction based on a positive or negative adaptivity score, wherein the negative adaptivity score is based on at least one of a negative emotional state and a negative cognitive score based on incorrect answers to the one or more instructional components and indicates a need to provide an alternative learning pathway relating to the one or more instructional components, and the positive adaptivity score is based on at least one of a positive emotional state and a positive cognitive score based on correct answers to the one or more instructional components and indicates that the individual is prepared for advancement to a higher level of learning;

generating a learner profile, populating the learner profile with the adaptivity score; and generating supplemental learner profile data by combining the cognitive data and affective data and comparing the supplemental learner profile data to a normed learner population data to select an adaptive instruction to provide to the learner;

populating the learner profile with the cognitive score to provide a learner profile containing one or more preferred learning modalities for the learner, presenting to the learner the adaptive instruction, wherein the adaptive instruction comprises alternative remedial instructional components relating to the one or more instructional components in the event of a negative adaptivity score, and advanced instructional components in the event of a positive adaptivity score, wherein the remedial instructional components and the advanced instructional components are linked to full instructional component metadata; and wherein the step of presenting to the learner the adaptive instruction further takes into account the supplemental learner profile data, including cognitive data, affective data, the normed learner population data, and the one or more preferred learning modalities for the learner.

2. The method according to claim 1, further comprising the step of correlating the emotional state data which was captured for the learner to emotional state data collected from other learners who experienced identical instructional components.

3. The method according to claim 1, wherein the emotional state data and cognitive data from a plurality of questions is used to generate a trend in learning by the learner.

4. The method according to claim 1, wherein the one or more instructional components are selected from the group consisting of on-screen text, explanatory graphics, video with narration, video without narration, and assessment questions.

5. The method according to claim 1, wherein the one or more instruction components comprise performance evaluations as well as presentation of instructional content optimized to provide an optimal learning outcome.

6. The method according to claim 1, wherein the step of capturing emotional state data is performed a minimum of once every two seconds.

7. The method according to claim 1, wherein the instructional components are presented to the learner on a web-enabled interface.

8. The method according to claim 1, wherein the one or more processors to analyze the facial data which was captured is performed on an analysis server.

9. The method according to claim 1, wherein the facial data includes information on one or more of a group consisting of facial expressions, action units, head gestures, smiles, squints, lowered eyebrows, raised eyebrows, smirks, and attention.

10. The method according to claim 1 wherein the emotional states include one or more of a group consisting of anger, anxiety, worry, comfort, hopefulness, confidence, boredom, indifference, interest, curiosity, intrigue, contempt, discouragement, dissatisfaction, satisfaction, thrill, enthusiasm, dread, apprehension, disgust, calmness, anticipation, fear, excitation, frustration, confusion, insight, happiness, sadness, enlightenment, surprise, and inspiration.

11. The method according to claim 1 wherein the presenting of the one or more instructional components to a learner is done on a mobile device or computer and further comprising recording of facial images with the mobile device as part of the capturing of the mental state data.

12. The method according to claim 1, wherein the learner profile is supplemented with the learner's response to the alternative instructional component or higher level of learning provided to the learner in comparison to the learner's cognitive performance to improve the learner profile on an ongoing basis.

13. The method according to claim 1, wherein the learner selects an instructional component based on the learner's personal preference to acquire a higher level cognitive performance with respect to the instructional component.

14. The method of claim 1, wherein the step of generating supplemental learner profile data comprises an affect aggregator retrieving a first set of affect data relating to the learner and at least one second set of affect data relating to a second learner, and correlating the first set of affect data relating to the learner to the at least one second set of affect data relating to the second learner.

15. The method of claim 14, wherein the step of correlating the first set of affect data relating to the learner to the at least one second set of affect data relating to the second learner comprises determining correlation vectors for the first set of affect data and the at least one second set of affect data.

16. The method of claim 1, wherein the metadata comprises at least one of: a target grade level, a target difficulty level, and a significantly valid average affective rating.

17. The method of claim 1, wherein the step of combining the cognitive data and the affective data and performing algorithmic analysis to determine the adaptive instruction is performed in less than five seconds.

18. The method according to claim 1, wherein the method is performed by a computer program product embodied in a non-transitory computer readable medium for cognitive and affective based computer adaptive learning, the computer product comprising:

code for presenting to a learner one or more instructional components linked to full instructional component metadata for the adaptive learning system to reference;

code for capturing, by a camera in communication with one or more processors, affective data in a learning profile for each the learner in reaction to the one or more instructional components, wherein the affective data includes facial expression data while the one or more instructional components are presented, and wherein the affective data is captured at least once every three seconds;

code for inferring emotional states of the learner, using the one or more processors to analyze the facial expression data which was captured;

code for capturing cognitive data for the learner based on the learner's correct or incorrect answer to the one or more instructional components, wherein the cognitive data is indicative of the learner's performance in responding to the one or more instructional components;

code for combining the cognitive data and the affective data and performing algorithmic analysis to determine the adaptive instruction based on a positive or negative adaptivity score, wherein the negative adaptivity score is based on at least one of a negative emotional state and a negative cognitive score based on incorrect answers to the one or more instructional components and indicates a need to provide an alternative learning pathway relating to the one or more instructional components, and the positive adaptivity score is based on at least one of a positive emotional state and and/or a positive cognitive score based on correct answers to the one or more instructional components and indicates that the individual is prepared for advancement to a higher level of learning;

code for generating a learner profile;

code for populating the learner profile with the adaptivity score; and code for generating supplemental learner profile data by combining the cognitive data and affective data and comparing the supplemental learner profile data to normed learner population data to select an adaptive instruction to provide to the learner;

code for populating the learner profile with the cognitive score to provide a learner profile containing one or more preferred learning modalities for the learner; and code for presenting to the learner the adaptive instruction, and wherein the adaptive instruction comprises alternative remedial instructional components relating to the one or more instructional components in the event of a negative adaptivity score, and advanced instructional components in the event of a positive adaptivity score, wherein the remedial instructional components and the advanced instructional components are linked to full instructional component metadata; and wherein the step of presenting to the learner the adaptive instruction further takes into account the supplemental learner profile data, including cognitive data, affective data, the normed learner population data, and the one or more preferred learning modalities for the learner.

19. A computer system for cognitive and affective based computer adaptive learning comprising:

a memory for storing instructions;

a webcam for capturing facial data;

one or more processors attached to the memory wherein the one or more processors are configured to:

present one or more instructional components to a learner, the one or more instructional components comprising full instructional component metadata for the computer system to reference;

capture, by the webcam in communication with the one or more processors, affective state data in a learning profile for of the learner in response to the one or more instructional components, wherein the affective state data includes facial data while the one or more instructional components are presented;

infer emotional states of the learner, using the one or more processors to analyze the facial data which was captured;

capture cognitive data for the learner based on the learner's correct or incorrect answer to the one or more instructional components, wherein the cognitive data is indicative of the learner's performance in responding to the one or more instructional components;

combining the cognitive data and the affective data and performing algorithmic analysis to determine the adaptive instruction based on a positive or negative adaptivity score, wherein the negative adaptivity score is based on at least one of a negative affective state and a negative cognitive score based on incorrect answers to the one or more instructional components and indicates a need to provide an alternative learning pathway relating to the one or more instructional components, and the positive adaptivity score is based on at least one of a positive emotional state and a positive cognitive score based on correct answers to the one or more instructional components and indicates that the individual is prepared for advancement to a higher level of learning;

generate a learner profile, populate a learner profile with the adaptivity score;

generate supplemental learner profile data by combining the cognitive data and affective data and comparing the supplemental learner profile data to a normed learner population data to select an adaptive instruction to provide to the learner;

populate the learner profile with the cognitive score to provide a learner profile containing one or more preferred learning modalities for the learner, and present to the learner the adaptive instruction, wherein the adaptive instruction comprises alternative learning content relating to the one or more instructional components in the event of a negative adaptivity score, and a higher level of learning to the learner in the event of a positive adaptivity score, and wherein the remedial instructional components and the advanced instructional components are linked to full instructional component metadata; and wherein the step of presenting to the learner the adaptive instruction further takes into account the supplemental learner profile data, including cognitive data, affective data, the normed learner population data, and the one or more preferred learning modalities for the learner.

* * * * *